(12) United States Patent
Hamaya

(10) Patent No.: US 7,284,867 B2
(45) Date of Patent: Oct. 23, 2007

(54) PROJECTOR

(75) Inventor: Ikuo Hamaya, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 220 days.

(21) Appl. No.: 11/018,811

(22) Filed: Dec. 21, 2004

(65) Prior Publication Data

US 2005/0162619 A1    Jul. 28, 2005

(30) Foreign Application Priority Data

Dec. 25, 2003    (JP)    ............ JP2003-430872

(51) Int. Cl.
 *G03B 21/00* (2006.01)
 *G03B 21/14* (2006.01)
(52) U.S. Cl. .................... 353/69; 353/31
(58) Field of Classification Search ........... 353/69, 353/85, 31, 34, 94, 122; 349/5, 7, 8, 62; 345/102; 348/744
 See application file for complete search history.

(56) References Cited

U.S. PATENT DOCUMENTS 7,052,138 B2 * 5/2006 Matsui ............ 353/31

FOREIGN PATENT DOCUMENTS

| JP | 61-97283 | 6/1986 |
|----|----------|--------|
| JP | 4-136925 | 5/1992 |
| JP | 4-307890 | 10/1992 |
| JP | 5-91376 | 4/1993 |
| JP | 6-55131 | 7/1994 |
| JP | 2001-343703 | 12/2001 |

OTHER PUBLICATIONS

Japanese Office Action for Japanese patent application No.: 2003-430872, issue Nov. 28, 2006, and English translation thereof, 4 pages.
Japanese Office Action for Japanese Application No. 2003-430872, mailed on Feb. 15, 2007, and English translation thereof (5 pages).

* cited by examiner

*Primary Examiner*—Rodney Fuller
(74) *Attorney, Agent, or Firm*—Osha Liang LLP

(57) ABSTRACT

When white light emitted by a lamp is projected onto a screen, a color detection sensor receives light reflected by the screen, and detects in the reflected light color levels for red, green and blue. A microcomputer calculates correction values so that the balance of the detected color levels of the reflected light match the balance of the predesignated color levels for the red, green and blue in the ideal white that are stored in a flash memory. Thereafter, upon receiving a video signal from an input terminal, the color detection unit employs the correction values obtained by the microcomputer to correct the color levels of the video signal, and displays an image on the screen.

4 Claims, 4 Drawing Sheets

| | RED | GREEN | BLUE |
|---|---|---|---|
| RGB LEVELS OF LIGHT REFLECTED BY SCREEN | Rh | Gh | Bh |
| RATIO RELATIVE TO GREEN LEVEL | $\frac{Rh}{Gh}$ | | $\frac{Bh}{Gh}$ |
| CORRECTION VALUE | $\alpha = \frac{Rr}{Gr} \times \frac{Gh}{Rh}$ | | $\beta = \frac{Br}{Gr} \times \frac{Gh}{Bh}$ |
| RATIO RELATIVE TO GREEN LEVEL | $\frac{Rr}{Gr}$ | | $\frac{Br}{Gr}$ |
| RGB LEVELS OF IDEAL WHITE | Rr | Gr | Br |
| | RED | GREEN | BLUE |

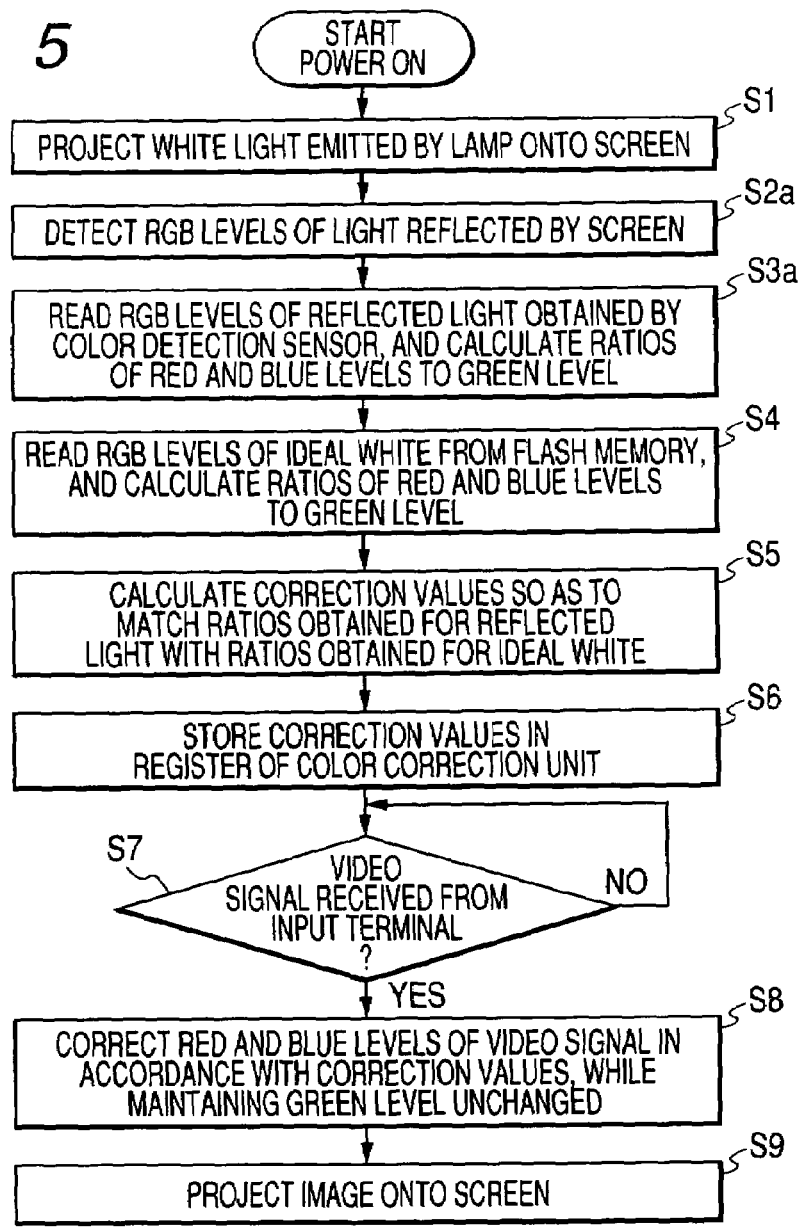

PROJECTOR

BACKGROUND OF THE INVENTION

1. Field of the Invention

The present invention relates to a projector that projects light onto a screen to display images.

2. Description of the Related Art

As an apparatus for displaying images having arbitrary sizes, a projector is available that adjusts light emitted by a light source, based on video signals received from a personal computer, and uses the adjusted light to project images onto a white screen. The adjustment of the light by the projector is performed in the manner described, for example, in JP-UM-A-6-055131. That is, white light emitted by a light source, a lamp, is split, using a separation mirror, into beams of the three primary colors, red, green and blue, and the three beams are fed into a light shutter that, in accordance with video signals, controls how much of each of the individual received beams is permitted to pass through. The three beams are then synthesized, using a synthesis mirror, to obtain a single light beam that is projected through a lens and onto a screen, forming an image thereon.

For this conventional projector, since the luminance of an image displayed on the screen depends on screen gain, the luminance must be adjusted each time the screen is changed. Therefore, according to the projector disclosed in JP-UM-A-6-055131, while irradiation of the screen is being performed, based on a reference signal, a luminance detection sensor, provided on the front face of the projector, receives light reflected by the screen and detects the luminance level of the reflected light. When the detected luminance level is higher than a reference value, the luminance is automatically changed so as to reduce the contrast of a video signal. Whereas when the detected luminance level is lower than the reference value, the luminance is automatically changed so as to increase the contrast of the video signal.

Further, for the conventional projector, the focal length of the lens must be adjusted to project a focused image on the screen. Therefore, according to a projector disclosed in JP-A-2001-343703, while irradiation of a screen is being performed, a light flux reflected from the screen is projected through a lens and a beam splitter to a light-receiving device, and based on a signal output by the light-receiving device, the focal point of the lens is adjusted automatically.

SUMMARY OF THE INVENTION

For a conventional projector, the coloration of an image displayed on the screen depends on the color balance (coloring) for the white of a screen. Therefore, when the screen color balance is altered by changing screens, or by a disturbance produced by light, such as light from various types of lighting fixtures or solar radiation in the daytime or the evening, in the environment wherein the projector is employed, the coloration of an image projected on the screen is also changed, and an image having a predetermined coloration can not consistently be presented for viewing. For the projectors disclosed in JP-UM-A-6-055131 and JP-A-2001-343703, no consideration is given to the coloration of the image.

To resolve this problem, it is one of objects of the present invention to provide a projector that can consistently project images having the same coloration.

According to a first aspect of the invention, there is provided a projector including: a light source that projects an image onto a screen in accordance with a video signal input to the projector; a storage unit that stores color levels of red, green and blue for a predesignated ideal white; a color detection unit that receives light reflected by the screen when an image of white light is projected onto the screen, and detects the color levels of red, green and blue of the reflected light; a calculation unit that calculates a correction value to obtain a match between a balance for the color levels stored in the storage unit and a balance for the color levels of the reflected light detected by the color detection unit; a correction unit that employs the correction value to correct color levels of the video signal; a remote control unit that is provided separately from the light source and including the color detection unit; a transmission unit provided on the remote control unit and transmits the color levels detected by the color detection unit; and a reception unit that receives the color levels transmitted from the transmission unit, wherein the calculation unit calculates the correction value by matching a ratio in the reflected light and in the ideal white, the ratio between a color level of a reference color selected from among the red, green and blue and a color level of the remaining two colors, and wherein the correction unit employs the correction value to correct the color levels of the video signal for the two colors except for the reference color.

According to a second aspect of the invention, there is provided a projector including: a light source that projects an image onto a screen in accordance with a video signal input to the projector; a storage unit that stores color levels of red, green and blue for a predesignated ideal white; a color detection unit that receives light reflected by the screen when an image of white light is projected onto the screen, and detects the color levels of red, green and blue of the reflected light; a calculation unit that calculates a correction value to obtain a match between a balance for the color levels stored in the storage unit and a balance for the color levels of the reflected light detected by the color detection unit; and a correction unit that employs the correction value to correct color levels of the video signal.

BRIEF DESCRIPTION OF THE DRAWINGS

The above objects and advantages of the present invention will become more apparent by describing preferred exemplary embodiments thereof in detail with reference to the accompanying drawings, wherein:

FIG. 5 is a flowchart showing another example operation; and

FIG. 6 is a diagram showing another example for RGB levels.

DETAILED DESCRIPTION OF THE PREFERRED EMBODIMENTS

Referring now to the accompanying drawings, a description will be given in detail of preferred embodiments of the invention.

Figure 1:
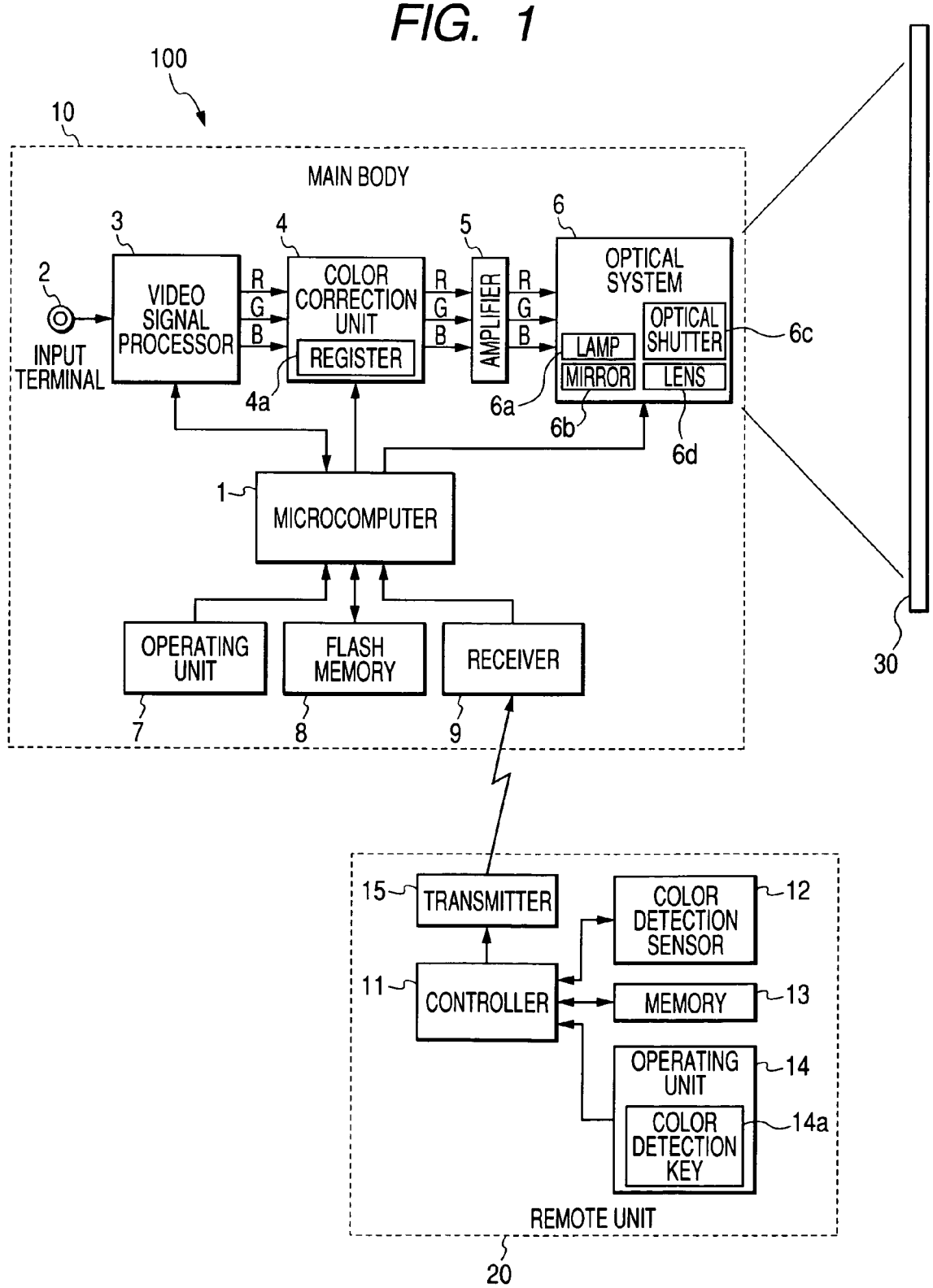
FIG. 1 is a block diagram showing a projector according to one embodiment of the present invention.

FIG. 1 is a block diagram showing a projector 100 according to one embodiment of the present invention. In FIG. 1, the projector 100 includes a main body 10 and a remote unit prepared separately from the main body 10. In the main body 10, a microcomputer 1 controls the individual sections of the main body 10, and is constituted by a CPU and memories, such as a ROM and a RAM. An input terminal 2 is used to receive video signals from a personal computer and a television receiver (neither of them shown). A video signal processor 3, which is, for example, a matrix circuit, splits a video signal received from the input terminal 2 into RGB signals for three primary colors, red R, green G and blue B, and outputs the RGB signals. A color correction unit 4, which is constituted by a register 4a and a RGB signal correction circuit, corrects the color levels (hereinafter referred to as RGB levels) of the RGB signals received from the video signal processor 3 and outputs the corrected signals. An amplifier 5 amplifies the RGB signals received from the color correction unit 4 and outputs the thus obtained signals.

An optical system 6 includes a lamp 6a as a light source, a plurality of mirrors 6b, a plurality of optical shutters 6c and a lens 6d. Based on the RGB signals received from the amplifier 5, the optical system 6 adjusts white light emitted by the lamp 6a, and projects the adjusted light onto a white screen 30. As a result, an image is projected on the screen 30. Specifically, white light from the lamp 6a is split into beams of the three primary colors, red, green and blue by the mirror 6b, used for separating the colors, and the three beams enter the optical shutters 6c. The optical shutters 6c, in accordance with the input RGB signals, control how much of each of the received beams passes through, and the three beams are synthesized to obtain a single beam by the mirror 6b, used for the synthesis process. The beam obtained through the synthesis process is projected through the lens 6d onto the screen 30, whereon an image is formed. An operating unit 7 includes various keys such as a power key. A flash memory 8 is used to store the RGB levels, red, green and blue, of the predesignated ideal white. And a receiver 9 receives data from the remote unit 20.

In the remote unit 20, a controller 11 controls the individual sections of the remote unit 20. A color detection sensor 12 receives light reflected by the screen 30 after the white light emitted by the lamp 6a strikes the screen 30, and detects the RGB levels, red, green and blue, of the reflected light. A memory 13 is used by the controller 11 to temporarily store information for the RGB levels (hereinafter referred to as RGB data) of the reflected light obtained by the color detection sensor 12. An operating unit 14 includes various keys, such as a color detection key 14a that is manipulated to permit the color detection sensor 12 to detect the RGB levels of light reflected by the screen 30. A transmitter 15 transmits data to the receiver 9 of the main body 10 by radio or across a wire. And the controller 11 employs the transmitter 15 to transmit to the receiver 9 as RGB data the results obtained by the color detection sensor 12.

The microcomputer 1 reads the RGB levels of the reflected light from the RGB data received by the receiver 9, and reads the RGB levels of the ideal white from the flash memory 8. Then, the microcomputer 1 calculates a correction value, so that the balance (hereinafter referred to as the color balance of reflected light) for the RGB levels of the reflected light matches the balance (hereinafter referred to as the color balance of the ideal white) for the RGB levels of the ideal white, and stores the correction value in the register 4a of the color correction unit 4. Thereafter, the color correction unit 4 employs the correction value stored in the register 4a to correct the RGB signals obtained by splitting a video signal.

In this configuration, the microcomputer 1 of the present invention serves as an example calculation unit and the color correction unit 4 of the present invention serves as an example correction unit. The flash memory 8 of the invention serves as an example storage unit and the receiver 9 of the invention serves as an example reception unit. The remote unit 20 of the invention serves as an example remote control unit, the color detection sensor 12 of the invention serves as an example color detection unit, and the transmitter 15 of the invention serves as a transmission unit.

Figure 2:
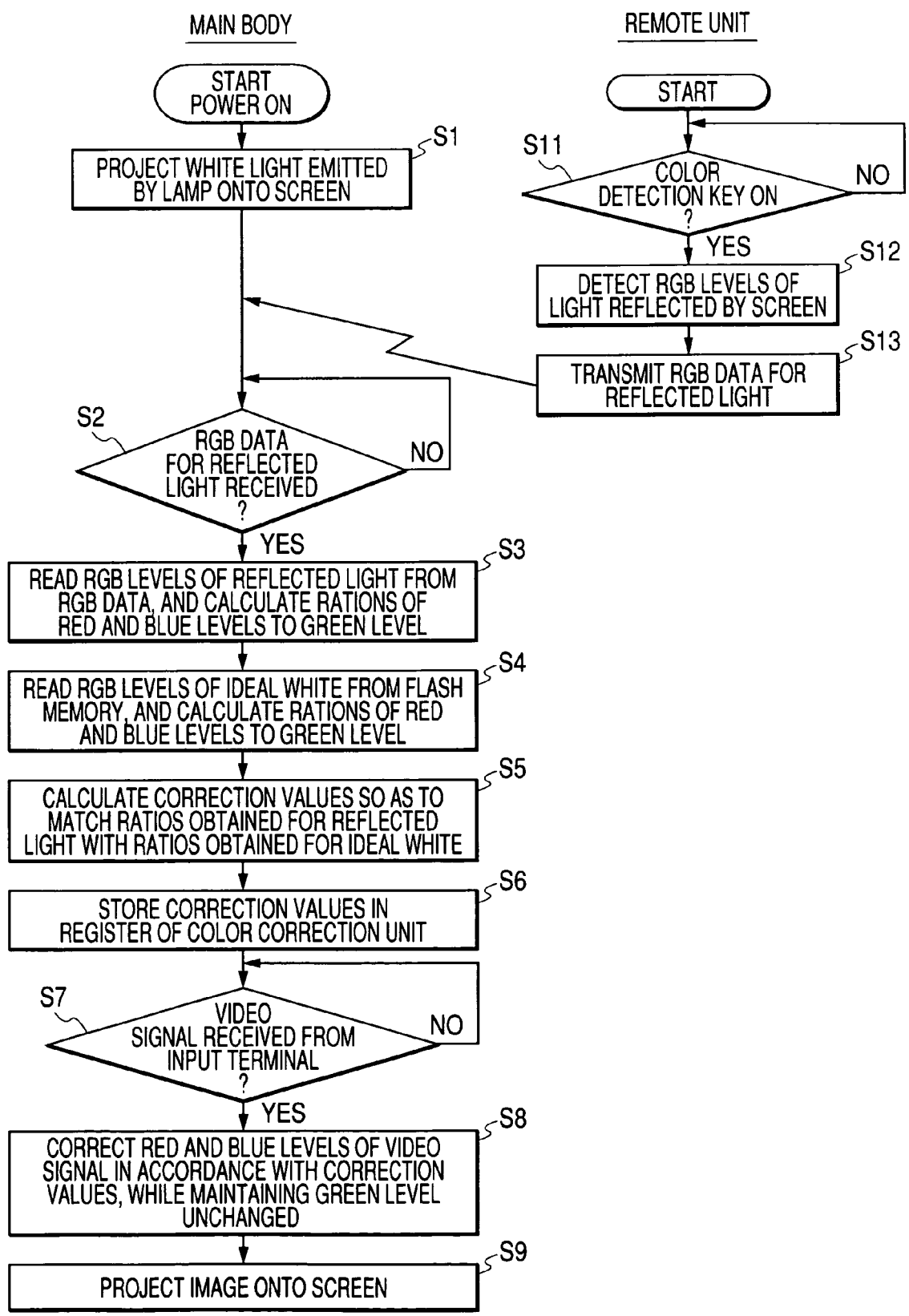
FIG. 2 is a flowchart showing the operation of the projector.
Figures 3, 4:
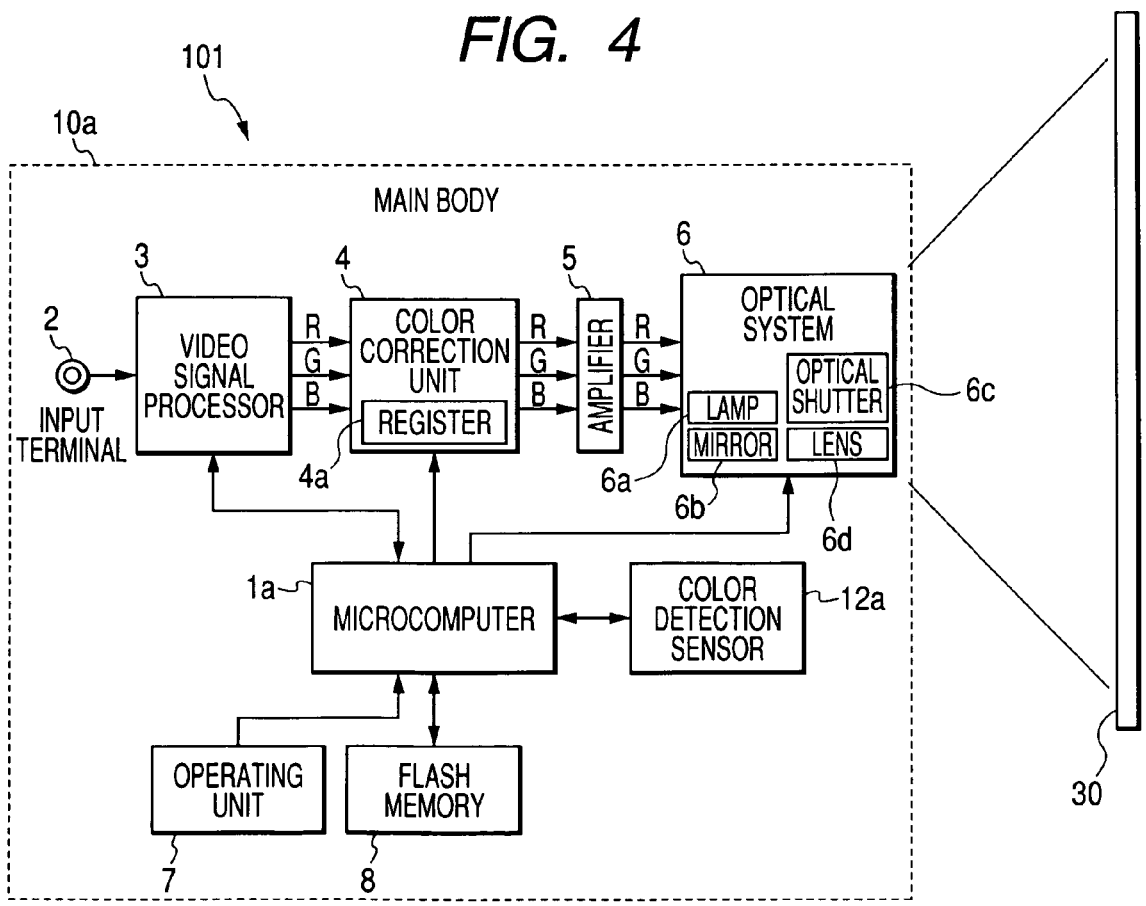
FIG. 3 is a diagram showing an example process performed by a microcomputer for calculating correction values.
FIG. 4 is a block diagram showing another example projector.

FIG. 2 is a flowchart showing the operation of the projector 100. The individual processes on the left are executed by the microcomputer 1 of the main body 10, and the individual processes on the right are executed by the controller 11 of the remote unit 20. FIG. 3, which shows an example process performed by the microcomputer 1 to calculate the correction value, will be referred to, as needed, during the explanation of the processing in FIG. 2. In FIG. 2, when a user manipulates the power key of the operating unit 7 to turn on the main body 10 of the projector 100, the optical system 6 of the microcomputer 1 projects unadjusted white light, emitted by the lamp 6a, onto the screen 30 (step S1). At this time, a video signal is not received from the input terminal 2.

When the white light is emitted by the lamp 6a and the user sets the color detection key 14a of the operating unit 14 to the ON state (YES at step S11), the controller 11 permits the color detection sensor 12 to detect the RGB levels, red, green and blue, of light reflected by the screen 30 (step S12). Then, the controller 11 temporarily stores, in the memory 13, RGB data consisting of information for the detected RGB levels of the reflected light, and permits the transmitter 15 to transmit the RGB data to the receiver 9 of the main body 10 (step S13).

When the receiver 9 receives the RGB data for the reflected light (YES at step S2), the microcomputer 1 reads the RGB levels of the reflected light from the received RGB data, and calculates a ratio of the level of red to the level of green, which is a reference color, and a ratio of the level of blue to the level of green (step S3). According to the example in FIG. 3, since the level of the red for the reflected light is Rh, the level of the green is Gh and the level of the blue is Bh, the ratio of the red level Rh to the green level Gh is Rh/Gh, and the ratio of the blue level Bh to the green level Gh is Bh/Gh. The two ratios Rh/Gh and Bh/Gh correspond to the color balance for the reflected light. Sequentially, the microcomputer 1 reads the RGB levels of ideal white from the flash memory 8, and calculates the ratio for the level of red to the level of green, which is a reference color, and a ratio of the level of blue to the level of green (step S4 in FIG. 2). According to the example in FIG. 3, since the red level of ideal white is Rr, the green level is Gr and the blue level is Br, the ratio for the red level Rr to the green level Gr is Rr/Gr, and the ratio for the blue level Br to the green level Gr is Br/Gr. The two ratios Rr/Gr and Br/Gr correspond to the color balance for the ideal white. Thereafter, the microcomputer 1 compares the ratios for the reflected light with the ratios for the ideal white, and calculates correction values to match the ratios for the reflected light with the ratios for the ideal white (step S5 in FIG. 2). According to the example in FIG. 3, since the obtained ratios for the reflected light are Rh/Gh and Bh/Gh, and the obtained ratios for the ideal white are Rr/Gr and Br/Gr, a correction value $\alpha=(Rr/Gr)\times(Gh/Rh)$ is obtained to match the ratio Rh/Gh for the reflected light with the ratio Rr/Gr for the ideal white, and a correction value β=(Br/Gr)×(Gh/Bh) is obtained to match the ratio Bh/Gh for the reflected light with the ratio Br/Gr for the ideal white. After these calculations, the microcomputer 1 stores the obtained correction values in the register 4a of the color correction unit 4 (step S6).

Thereafter, when a video signal is received from the input terminal 2 (YES at step S7), the video signal processor 3 splits the video signal into RGB signals, and under the control of the microcomputer 1, the color correction unit 4 employs the correction values stored in the register 4a to correct the red level and the blue level of the RGB signals, while leaving the green level unchanged (step S8). For example, the color correction unit 4 corrects the red level of the RGB signals in accordance with the correction value α, and corrects the blue level in accordance with the correction value β. The amplifier 5 amplifies the RGB signals corrected by the color correction unit 4 and transmits the resultant signals to the optical system 6. Then, under the control of the microcomputer 1, the optical system 6 projects an image on the screen 30 based on the received RGB signals (step S9).

As is described above, the RGB levels of the video signal are corrected by using correction values that are obtained so that, when light is reflected from the screen 30 after white light, emitted by the lamp 6a, has been projected onto the screen 30, the color balance of the reflected light can match the color balance of the ideal white. Therefore, when the RGB levels (coloration) of the white of the screen 30 are changed, an image having a predetermined (ideal) coloration can be consistently displayed on the screen 30 and viewed. Furthermore, since the color detection sensor 12 and the transmitter 15 are provided for the remote unit 20, and the receiver 9 is provided for the main body 10, the RGB levels of light reflected by the screen can be detected by using the remote unit 20 at an arbitrary location. Therefore, when the location for viewing the screen 30 is changed, an image having a predetermined coloration can be consistently projected and viewed.

According to the embodiment described above, the color detection sensor 12 has been provided for the remote unit 20 prepared separately from the main body 10. However, the present invention is not limited to this arrangement, and like a projector 101 in FIG. 4, a color detection sensor 12a may be provided for a main body 10a. In this case, it is preferable that the color detection sensor 12a be positioned at a located, opposite the screen 30, whereat light reflected by the screen 30 can be received and the color levels can be detected. FIG. 5 is a flowchart showing the operation of the projector 101. The individual processes are performed by a microcomputer 1a of the main body 10a. The same step numbers are provided for the processes that correspond to those in FIG. 2. In FIG. 5, when unadjusted white light, emitted by the lamp 6a, is projected onto the screen 30 (step S1), the microcomputer 1a employs the color detection sensor 12a to detect the RGB levels of the light reflected by the screen 30 (step S2a). Then, the microcomputer 1a reads the RGB levels of the reflected light detected by the color detection sensor 12a and calculates a ratio of the level of red to the level of green, which is a reference color, and a ratio of the level of blue to the level of green (step S3a). Thereafter, the microcomputer 1a performs the processes at steps S4 to S9 in the same manner as described above. When the color detection sensor 12a is provided for the main body 10a, an image having a predetermined coloration can also be consistently displayed on the screen 30 and viewed.

Furthermore, in this embodiment, only one set of RGB levels for the ideal white has been stored in the flash memory 8. However, the present invention is not limited to storing only one set, and as is shown in FIG. 6, a white table T in which a plurality of sets of RGB levels for ideal whites are entered may be stored in the flash memory 8. In the white table T, a white having the highest color temperature (bluish white) is entered at level 1, and the color temperature for white is lowered (reddish white) as the level is increased from 1 to 5. In this case, when the key of the operating unit 7 is manipulated to select, as an ideal white, the RGB levels at level 1 in the white table T, an image having a predetermined coloration desired by a user can be consistently displayed on the screen and viewed.

Further, in the embodiment, the color detection sensor 12 or 12a has detected the RGB levels of light reflected by the screen 30, and the microcomputer 1 or 1a has calculated the ratio of the red level to the green level of the reflected light and the ratio of the blue level to the green level. However, the present invention is not limited to this, and instead of the color detection sensor 12, a color detector may be provided for the main body 10 or 10a, or the remote unit 20 may not only detect the RGB levels of the reflected light, but may also calculate the ratio of the levels of the two colors of the reflected light to the level of the reference color.

As described above, according to the embodiment, when the color levels of the white for the screen are changed, an image having a predetermined (ideal) coloration can consistently be displayed and viewed.

According to the embodiment, the calculation unit calculates a correction value, so that a ratio of the levels of two colors in the reflected light to the level of a remaining, reference color matches a ratio of the levels of two colors in the ideal white to the level of a remaining, reference color. The correction unit then employs the correction value to correct the levels of two colors in a video signal, except for a reference color. With this arrangement, since the level of the reference color in the video signal can be employed to correct the other two colors, an image having a predetermined coloration can be consistently and exactly displayed on a screen.

According to the embodiment, the remote control unit is prepared separately from a projector main body, and includes a color detection unit and a transmission unit for transmitting the results obtained by the color detector to the projector main body, and the projector main body includes a reception unit for receiving, from the transmission unit, the results obtained by the color detection unit. The projector main body also includes the storage unit, the calculation unit and the correction unit described above. With this arrangement, when light emitted by the light source is directed to the screen by manipulating the remote control unit at an arbitrary place, the color levels of light reflected by the screen can be detected and obtained by the main body. Therefore, even when the location in which the screen is viewed is changed, an image having a predetermined coloration can be consistently displayed.

According to the present invention, when the color levels of the white for the screen are changed, an image having a predetermined coloration can be consistently projected and displayed on the screen.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A projector comprising:

a light source that projects an image onto a screen in accordance with a video signal input to the projector;

a storage unit that stores color levels of red, green and blue for a predesignated ideal white;

a color detection unit that receives light reflected by the screen when an image of white light is projected onto the screen, and detects the color levels of red, green and blue of the reflected light;

a calculation unit that calculates a correction value to obtain a match between a balance for the color levels stored in the storage unit and a balance for the color levels of the reflected light detected by the color detection unit;

a correction unit that employs the correction value to correct color levels of the video signal;

a projector body that includes the light source, the storage unit, the calculation unit, and the correction unit;

a remote control unit that is provided separately from the projector body and includes the color detection unit;

a transmission unit provided in the remote control unit that transmits the color levels detected by the color detection unit; and a reception unit provided in the projector body that receives the color levels transmitted from the transmission unit, wherein the calculation unit calculates the correction value by matching a ratio in the reflected light and in the ideal white, the ratio between a color level of a reference color selected from among the red, green and blue and a color level of the remaining two colors, and wherein the correction unit employs the correction value to correct the color levels of the video signal for the two colors except for the reference color.

2. A projector comprising:

a light source that projects an image onto a screen in accordance with a video signal input to the projector;

a storage unit that stores color levels of red, green and blue for a predesignated ideal white;

a color detection unit that receives light reflected by the screen when an image of white light is projected onto the screen, and detects the color levels of red, green and blue of the reflected light;

a calculation unit that calculates a correction value to obtain a match between a balance for the color levels stored in the storage unit and a balance for the color levels of the reflected light detected by the color detection unit; and a correction unit that employs the correction value to correct color levels of the video signal;

a projector body that includes the light source, the storage unit, the calculation unit, and the correction unit;

a remote control unit that is provided separately from the projector body and includes the color detection unit;

a transmission unit provided in the remote control unit that transmits the color levels detected by the color detection unit; and a reception unit provided in the projector body that receives the color levels transmitted from the transmission unit.

3. The projector according to claim 2, wherein the calculation unit calculates the correction value by matching a ratio in the reflected light and in the ideal white, the ratio between a color level of a reference color selected from among the red, green and blue and a color level of the remaining two colors, and wherein the correction unit employs the correction value to correct the color levels of the video signal for the two colors except for the reference color.

4. The projector according to claim 2, wherein the reference color is green.

* * * * *